(12) United States Patent
Greenberg et al.

(10) Patent No.: US 12,214,878 B2
(45) Date of Patent: **\*Feb. 4, 2025**

(54) LIFT NACELLE

(71) Applicant: COPPERHEAD AERONAUTICS, LLC, Tucson, AZ (US)

(72) Inventors: Phillip Greenberg, Tucson, AZ (US); Ian Wells, Glendale, AZ (US)

(73) Assignee: Copperhead Aeronautics, LLC, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,141

(22) Filed: Feb. 29, 2024

(65) Prior Publication Data
US 2024/0199193 A1    Jun. 20, 2024

Related U.S. Application Data

(63) Continuation of application No. 17/891,344, filed on Aug. 19, 2022, now Pat. No. 11,939,060, which is a continuation of application No. 16/829,784, filed on Mar. 25, 2020, now Pat. No. 11,427,300.

(60) Provisional application No. 62/826,480, filed on Mar. 29, 2019.

(51) Int. Cl.
*B64C 7/02*     (2006.01)
*B64C 27/20*    (2023.01)
*B64C 29/00*    (2006.01)

(52) U.S. Cl.
CPC ............... *B64C 7/02* (2013.01); *B64C 27/20* (2013.01); *B64C 29/0025* (2013.01)

(58) Field of Classification Search
CPC ... B64C 7/02; B64C 29/0025; B64C 2201/04; B64C 23/02; B64C 27/20; B64C 29/0016; B64C 11/001
See application file for complete search history.

(56) References Cited

U.S. PATENT DOCUMENTS

| | | | | |
|---|---|---|---|---|
| 2,039,676 A | * | 5/1936 | Zaparka | B64C 23/08 244/21 |
| 2,929,580 A | * | 3/1960 | Ciolkosz | B64C 39/062 244/34 A |
| 3,684,216 A | * | 8/1972 | Morgan | B64C 23/005 244/36 |
| 4,071,207 A | * | 1/1978 | Piasecki | B64C 29/0025 244/221 |
| 5,180,119 A | * | 1/1993 | Picard | B64C 23/08 244/206 |

(Continued)

*Primary Examiner* — Valentina Xavier
(74) *Attorney, Agent, or Firm* — Snell & Wilmer L.L.P.

(57) ABSTRACT

A lift nacelle may comprise an airflow generator; a sidewall system coupled to the airflow generator and spanning in a first direction, wherein the sidewall system defines a nacelle interior space, wherein the airflow generator defines one of a forward boundary or an aft boundary of the nacelle interior space; and a lift body disposed in the nacelle interior space and spanning substantially perpendicular to the first direction and substantially perpendicular to an upward lift direction. The airflow generator may be configured to accelerate airflow in an aft direction into the nacelle interior space through the forward boundary of the nacelle interior space. The airflow may contact and/or interact with the lift body creating lift in response.

20 Claims, 11 Drawing Sheets

(56) References Cited

U.S. PATENT DOCUMENTS 7,364,115 B2 * 4/2008 Parks .................... B64C 11/001
                                                                     244/12.4

* cited by examiner

LIFT NACELLE

CROSS-REFERENCE TO RELATED APPLICATIONS

This application is a continuation of, and claims priority to and the benefit of, U.S. patent application Ser. No. 17/891,344, filed Aug. 19, 2022 and entitled "LIFT NACELLE," which is a continuation of, and claims priority to and the benefit of, U.S. patent application Ser. No. 16/829,784, filed Mar. 25, 2020 and entitled "LIFT NACELLE," now U.S. Pat. No. 11,427,300 issued Aug. 30, 2022, which is a nonprovisional of, and claims priority to and the benefit of, U.S. Provisional Patent Application No. 62/826,480, filed Mar. 29, 2019 and entitled "LIFT NACELLE," all of which are hereby incorporated by reference herein.

BACKGROUND

Current designs of aircraft intended for vertical takeoff and landing utilize horizontal propellers to accelerate air in a downward direction (i.e., toward the ground) to create upward thrust, thereby creating lift. However, such designs have significant limitations with regard to scalability. In such systems, power is proportional the area of the rotor (e.g., a propeller) times air velocity cubed, and thrust is proportional to the area of the rotor times air velocity squared. Therefore, in order to save power in such systems, the system must minimize air velocity and compensate by increasing the rotor area. If the rotor area remains constant, to increase thrust, the required power must increase cubically, which results in the thrust increasing quadratically (i.e., significantly more power must be provided for substantially less resulting thrust). Accordingly, to create more thrust within the current technological constraints, the aircraft industry must embrace a larger aircraft footprint, or identify power sources capable of the rigorous demands to achieve desired thrust increases.

SUMMARY

In various embodiments, a lift nacelle may comprise an airflow generator configured to generate airflow to interact with a lift body comprised in the lift nacelle, and create lift as a result. The lift body may comprise a sidewall system defining a nacelle interior space, and the lift body may be disposed in the nacelle interior space. In various embodiments, a lift nacelle may comprise an airflow generator; a sidewall system coupled to the airflow generator and spanning in a first direction, wherein the sidewall system defines a nacelle interior space, wherein the airflow generator defines one of a forward boundary or an aft boundary of the nacelle interior space; and/or a lift body disposed in the nacelle interior space and spanning substantially perpendicular to the first direction and substantially perpendicular to an upward lift direction. The airflow generator may be configured to accelerate airflow in an aft direction into the nacelle interior space through the forward boundary of the nacelle interior space, and the airflow may contact and/or interact with the lift body creating lift in response.

In various embodiments, the sidewall system may comprise a first sidewall, coupled to an airflow generator first side and spanning in the first direction, and a second sidewall, coupled to an airflow generator second side opposite the airflow generator first side and spanning in the first direction, wherein the lift body may span at least partially between the first sidewall and the second sidewall. In various embodiments, the lift nacelle may further comprise a shroud having a shroud wall enclosing a shroud interior. The airflow generator may be disposed within the shroud interior, and/or the first sidewall and/or the second sidewall may be coupled to the shroud. In various embodiments, at least a portion of a top boundary of the nacelle interior space corresponding to and spanning between a first sidewall top portion of the first sidewall and a second sidewall top portion of the second sidewall may be open, and/or at least a portion of a bottom boundary of the nacelle interior space spanning between a first sidewall bottom portion and a second sidewall bottom portion may be open. In various embodiments, an aft boundary of the nacelle interior space spanning between a first sidewall aft portion and a second sidewall aft portion may be open, wherein the aft boundary of the nacelle interior space is opposite the airflow generator defining the forward boundary of the nacelle interior space. In various embodiments, the aft boundary of the nacelle interior space may be forward of an aft portion of the lift body.

In various embodiments, the lift body may comprise an internal rotor configured to rotate about an axis of rotation spanning between the first sidewall and the second sidewall. In defining a rotational direction of the internal rotor, if the lift nacelle is viewed from an aft portion of the lift nacelle along an axis spanning from the aft portion to a forward portion of the lift nacelle, the first sidewall may be a left sidewall, and the axis of rotation protruding in a left direction outward from the nacelle interior space through the left sidewall is a positive rotational direction according to the right-hand rule of physics, the internal rotor rotates in a negative rotational direction according to the right-hand rule of physics.

In various embodiments, the internal rotor may comprise an outer rotor shell defining a hollow rotor interior, wherein the lift body may further comprise a motor disposed in the hollow rotor interior configured to rotate the outer rotor shell. In various embodiments, the lift body may further comprise a rotor shaft disposed in and along the hollow rotor interior, wherein the rotor shaft may be coupled to the motor. In various embodiments, the motor may be coupled to the rotor shaft via a mounting bracket, such that the motor is coupled to the mounting bracket, and the mounting bracket is coupled to the rotor shaft. In various embodiments, the motor may be configured to rotate and cause the outer rotor shell to rotate while the rotor shaft remains static.

In various embodiments, the lift nacelle may further comprise a power source coupled to at least one of the airflow generator, the first sidewall, the second sidewall, and the lift body, wherein the power source may be configured to provide power for operation of at least one of the airflow generator and the internal rotor. In various embodiments, the lift nacelle may further comprise a motor coupled to the internal rotor, external to an outer surface of the internal rotor, such that the internal rotor may rotate in response to rotation of the motor. In various embodiments, the internal rotor may comprise an outer surface and at least one ridge coupled to and protruding radially from the outer surface along at least a portion of a circumference of the outer surface.

In various embodiments, a method may comprise accelerating airflow, via an airflow generator comprised in a lift nacelle, in an aft direction into a nacelle interior space defined by a first sidewall and a second sidewall opposite the first side wall of the lift nacelle, wherein the first sidewall may be coupled to an airflow generator first side and spanning in a first direction and the second sidewall may be coupled to an airflow generator second side and spanning in the first direction, wherein the nacelle interior space may be between the first side wall and the second side wall; directing, via the first sidewall and the second sidewall, the airflow in the nacelle interior space to contact a lift body, wherein the lift body may be coupled to, and/or span at least partially between, the first sidewall and the second sidewall; decelerating a bottom airflow proximate a bottom portion of the lift body opposite a top portion of the lift body, causing a bottom air pressure of the bottom airflow to be higher than a top air pressure of a top airflow proximate the top portion of the lift body, in response to the airflow contacting the lift body; and/or creating a lift force on the lift nacelle in response to the decelerating the bottom airflow.

In various embodiments, the lift body may be an internal rotor, wherein the method further may comprise rotating the internal rotor about an axis of rotation spanning between the first sidewall and the second sidewall. In defining a rotational direction of the internal rotor, if the lift nacelle is viewed from an aft portion of the lift nacelle along an axis spanning from the aft portion to a forward portion of the lift nacelle, the first sidewall may be a left sidewall, and the axis of rotation protruding in a left direction outward from the nacelle interior space through the left sidewall is a positive rotational direction according to the right-hand rule of physics, the internal rotor rotates in a negative rotational direction according to the right-hand rule of physics. In various embodiments, the airflow generator may be one of a propeller and a fan, wherein the method may further comprise rotating the airflow generator causing the accelerating the airflow.

In various embodiments, the method may further comprise rotating a motor disposed within a hollow rotor interior defined by an outer shell of the internal rotor, wherein the rotating the internal rotor comprises rotating the outer shell, which is in response to the rotating the motor. The internal rotor may further comprise a rotor shaft disposed in and along the hollow rotor interior, wherein the rotor shaft may remain static in response to the motor and the outer shell rotating. In various embodiments, the internal rotor may comprise an outer surface and at least one ridge coupled to and protruding radially from the outer surface. The method may further comprise minimizing vortices of the airflow proximate outer ends of the internal rotor in response to the at least one ridge being coupled to the outer surface at an outer end of the internal rotor, wherein the outer ends of the internal rotor may be disposed proximate to or at least partially within one of the first sidewall or the second sidewall, and/or reducing spanwise flow of the airflow in response to the at least one ridge being coupled between outer ends of the internal rotor.

In various embodiments, a vehicle may comprise a main body; and at least one lift nacelle coupled to the main body. The lift nacelle may comprise an airflow generator; a sidewall system coupled to the airflow generator and spanning in a first direction, wherein the sidewall system may define a nacelle interior space, wherein the airflow generator may define one of a forward boundary or an aft boundary of the nacelle interior space; and/or a lift body disposed in the nacelle interior space and spanning substantially perpendicular to the first direction and substantially perpendicular to an upward lift direction. The airflow generator may be configured to accelerate airflow in an aft direction into the nacelle interior space through the forward boundary of the nacelle interior space, wherein the airflow may contact and/or interact with the lift body creating lift in response.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with the like element numbering throughout the figures are intended to be the same.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, coupled, fixed, connected, or the like may include permanent, removable, temporary, partial, full, and/or any other possible attachment option. Additionally, any reference to without contact (or similar phrases) may also include reduced contact or minimal contact.

Figure 1:
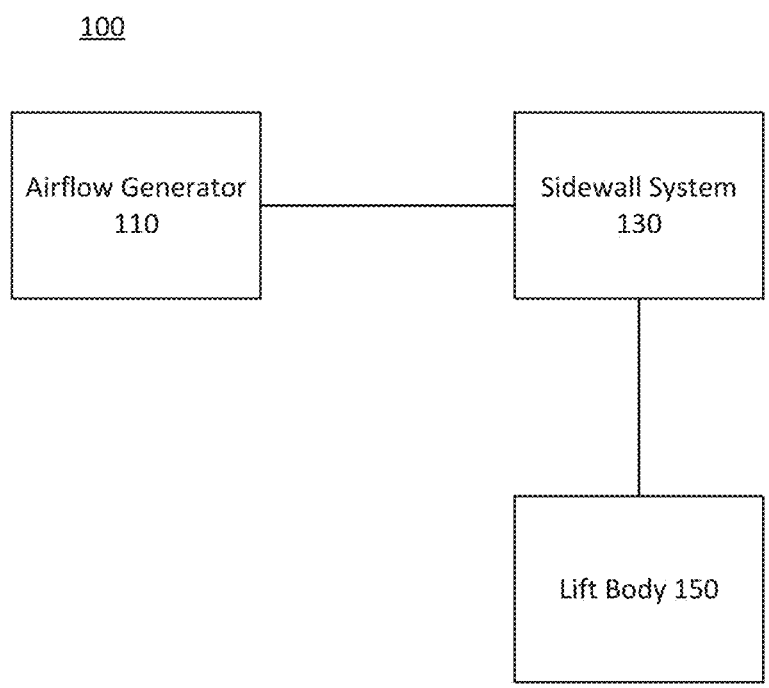
FIG. 1 illustrates a block diagram of the components of a lift nacelle, in accordance with various embodiments.

With reference to FIG. 1, a lift nacelle system 100 is depicted, in accordance with various embodiments. Lift nacelle system 100 may comprise an airflow generator 110, sidewall system 130, and/or a lift body 150. Airflow generator 110, a sidewall system 130, and/or lift body 150 may be coupled to one another in any suitable configuration or arrangement.

As used herein, "aft" refers to the direction associated with a tail (e.g., the back end) of an aircraft or lift nacelle (or any component comprised therein), or generally, to the direction of airflow generated by an airflow generator of a lift nacelle. As used herein, "forward" refers to the direction associated with a nose (e.g., the front end) of the aircraft or lift nacelle (or any component comprised therein), or generally, to the direction of flight or motion of an aircraft ("forward" is opposite "aft"). As used herein, "top" refers to a portion or edge of an aircraft or lift nacelle (or any component comprised therein) that is furthest from the ground (i.e., a plane from which an aircraft or lift nacelle would takeoff or lift). As used herein, "bottom" refers to a portion or edge of an aircraft or lift nacelle (or any component comprised therein) that is closest to the ground ("bottom" is opposite "top").

Figure 2A:
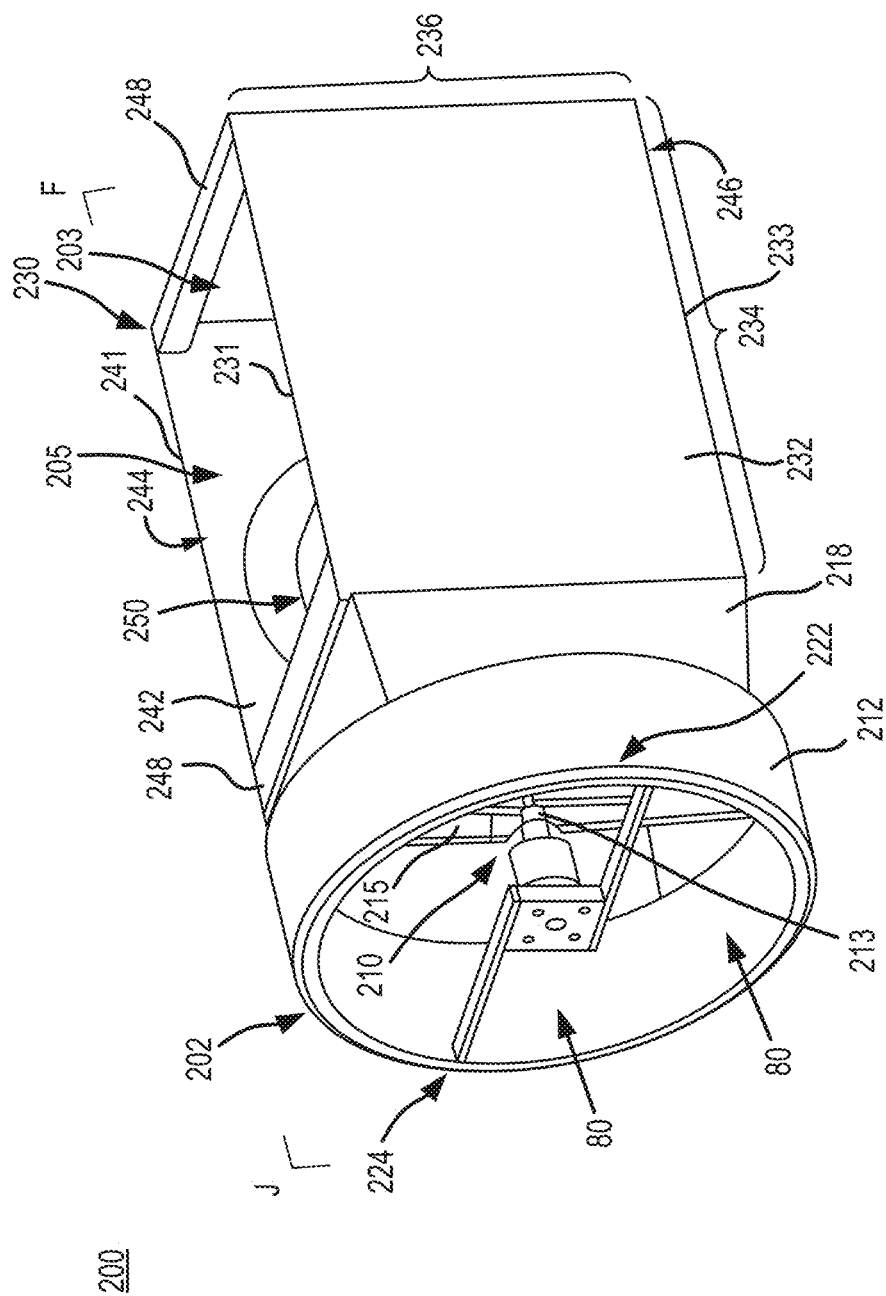
FIG. 2A illustrates a lift nacelle, in accordance with various embodiments.

FIG. 2A depicts a lift nacelle 200 in accordance with various embodiments. In various embodiments, lift nacelle 200 may comprise an airflow generator 210 (an example of airflow generator 110 in FIG. 1), a sidewall system 230 (an example of sidewall system 130 in FIG. 1), and/or a lift body 250 (an example of lift body 150 in FIG. 1). Airflow generator 210 may be any suitable device configured to accelerate airflow 80 (or any other fluid) in an aft direction through lift nacelle 200. In various embodiments, airflow generator 210 may comprise a propeller 213 comprising one or more blades 215 configured to rotate about an axis. With momentary reference to FIGS. 3A and 3B, an airflow generator 310 of a lift nacelle 300 may comprise a fan 313 or turbo fan comprising fan blades 315 configured to rotate about an axis, and/or a system of multiple airflow generators (e.g., multiple fans and/or propellers), for example, in parallel and/or series with one another. Fan 313 may be an electric ducted fan, which may have the advantages of wake stability (minimizing turbulence of airflow coming from fan 313), higher back pressure relative to other airflow generators, caused by the numerous fan blades 315 (the back pressure being advantageous because pressure loss may occur as a result of straightening airflow aft of the airflow generator), more energy may be absorbed by the numerous fan blades 315, and/or the like. In various embodiments, airflow generator 210 may comprise a turbo fan, for example, a turbo fan comprised in a gas turbine engine. In such embodiments, airflow generator 210 may comprise the gas turbine engine, and/or airflow 80 may comprise exhaust from the gas turbine engine.

In various embodiments, with reference again to FIGS. 2A and 2B, lift nacelle may comprise a shroud 212 (shroud 312 of lift nacelle 300 in FIGS. 3A and 3B being another example) enclosing a shroud interior. Airflow generator 210 may be disposed within the shroud interior. In various embodiments, shroud 212 may be a part of airflow generator 210. Shroud 212 may be configured to protect airflow generator 210 and/or more efficiently direct airflow 80 into a nacelle interior space 205 of lift nacelle 200. Shroud 212 may minimize or prevent airflow 80 passing through airflow generator 210 from escaping into the atmosphere, and therefore, being unutilized in the creation of lift by lift nacelle 200. Sidewalls of the sidewall system (e.g., first sidewall 232 and/or second sidewall 242) may be coupled to shroud 212. In various embodiments, lift nacelle 200 may comprise a cage (e.g., as part of a centrifugal fan) and/or any other device enclosing or surrounding at least a portion of airflow generator 210 (and/or as a component of airflow generator 210) to protect airflow generator 210 and/or efficiently direct airflow 80.

In various embodiments, airflow generator 210 may be disposed at a forward portion 202 of lift nacelle 200. In various embodiments, a lift nacelle may comprise an airflow generator at an aft end (e.g., aft portion 203) of a lift nacelle. In various embodiments, a lift nacelle may comprise an airflow generator forward of lift body 250 and/or aft of lift body 250.

In various embodiments, airflow generator 210 may be configured to accelerate airflow 80 from a forward portion 202 of lift nacelle 200 into a nacelle interior space 205 (whether the airflow generator of a lift nacelle is disposed at a forward and/or aft portion of the lift nacelle). Nacelle interior space 205 may be defined by sidewall system 230 (e.g., between first sidewall 232 and second sidewall 242). In various embodiments, nacelle interior space 205 may be linear from forward portion 202 of lift nacelle 200 to aft portion 203 of lift nacelle 200 (i.e., airflow may not be directed by ducting or the like in a nonlinear direction, excepting airflow directional change resulting from interaction with lift body 250). In various embodiments, airflow 80 may be directed along a nonlinear path by, for example, a grid and/or ducting between the forward portion of the lift nacelle and the lift body and/or between the aft portion of the lift nacelle and the lift body. In embodiments in which airflow generator 210 is disposed at a forward portion 202 of lift nacelle 200 (and forward of lift body 250), sidewall system 230 may be coupled to airflow generator 210 and extend in an aft direction. In embodiments in which airflow generator 210 is disposed at an aft portion of a lift nacelle (and aft of the lift body), the sidewall system may be coupled to the airflow generator and extend in a forward direction. In embodiments in which a lift nacelle comprises an airflow generator at both a forward and aft portions of a lift nacelle 200 (and forward and aft of the lift body), the sidewall system may be coupled to airflow generators and span therebetween.

In various embodiments, sidewall system 230 may be coupled to shroud 212 or other device surrounding or encapsulating airflow generator 210 (which may be a part of airflow generator 210). In various embodiments, lift nacelle 200 may comprise a duct 218 (duct 318 of lift nacelle 300 in FIGS. 3A and 3B being another example) coupled to airflow generator 210 and/or shroud 212, spanning between airflow generator 210 and/or shroud 212 and sidewall system 230. Duct 218 may be configured to direct airflow 80 into nacelle interior space 205 in a desired manner. Duct 218, and/or another grid within lift nacelle 200, may reduce swirl imparted on airflow 80 by airflow generator 210, and may serve to reduce turbulence in the airstream of airflow 80 prior to airflow 80 interacting with lift body 250.

A sidewall system (e.g., sidewall system 230) may comprise one or more sidewalls. In various embodiments, sidewall system 230 may comprise a first sidewall 232 and a second sidewall 242 opposite first sidewall 232. First sidewall 232 may be coupled to a first side 222 of airflow generator 210, and spanning in a first direction (e.g., an aft direction) from airflow generator 210. Second sidewall 242 may be coupled to a second side 224 of airflow generator 210 opposite the first side 222, and spanning in the first direction (e.g., the aft direction) from airflow generator 210. First sidewall 232 may be opposite second sidewall 242. Nacelle interior space 205 may be between and at least partially defined by sidewall system 230 (e.g., by first sidewall 232 and second sidewall 242). Sidewalls of a sidewall system may comprise any suitable configuration. In various embodiments, sidewalls of a sidewall system may comprise a uniform length along the width of each sidewall, and/or a uniform width along the length of each sidewall. For example, first sidewall 232 and second sidewall 242 of sidewall system 230 may comprise uniform lengths (e.g., first sidewall length 234) along their widths (e.g., first sidewall width 236) and/or uniform widths (e.g., first sidewall width 236) along their lengths (e.g., first sidewall length 234).

Figure 3A:
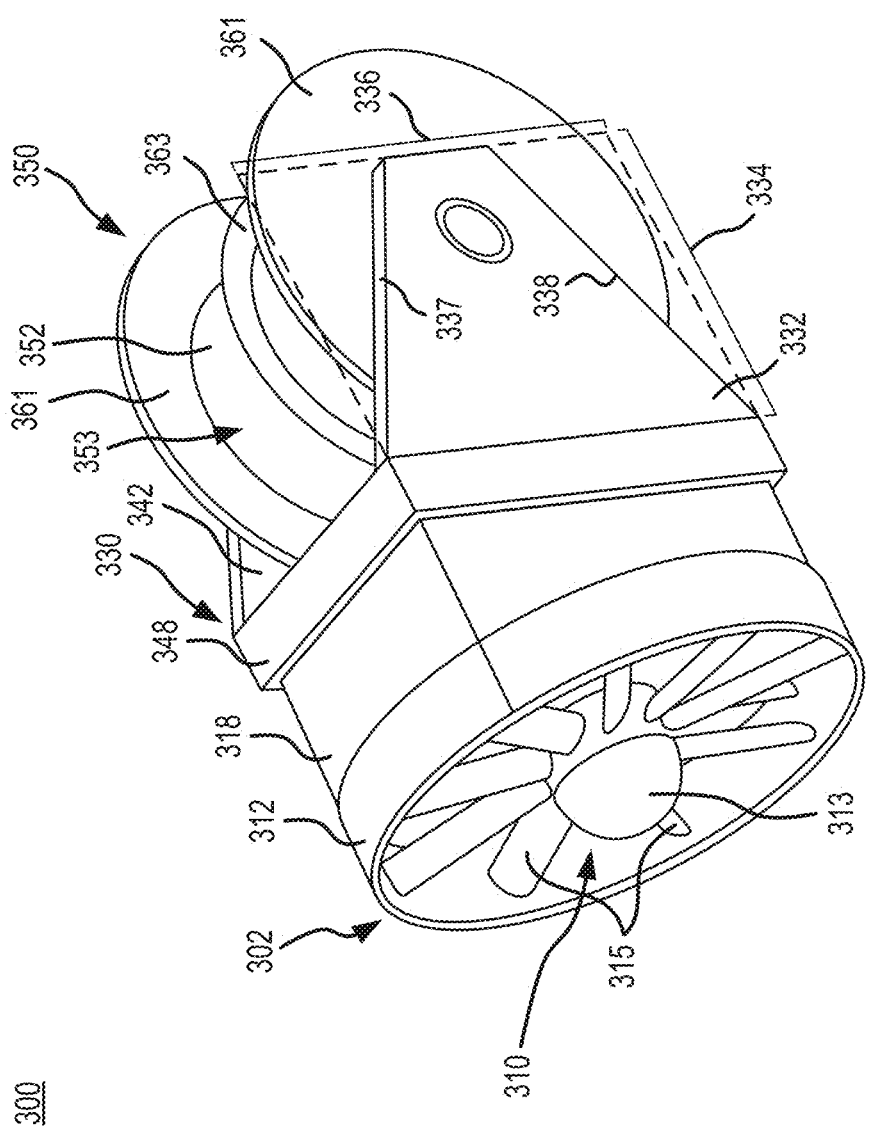
FIGS. 3A and 3B illustrate perspective views of a lift nacelle, in accordance with various embodiments.
Figure 3B:
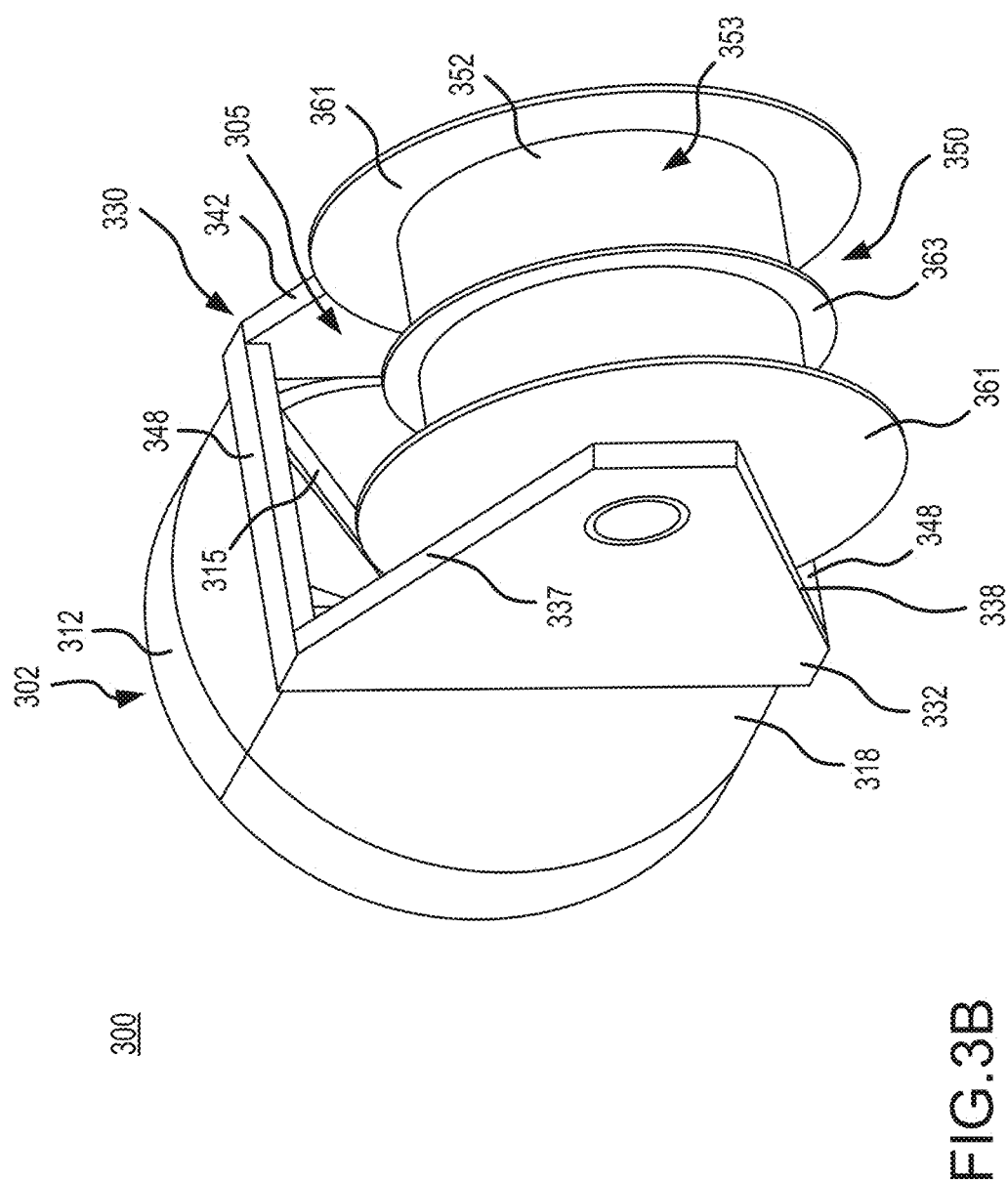

With reference to FIGS. 3A and 3B, in various embodiments, sidewalls of a sidewall system (e.g., first sidewall 332 and second sidewall 342 of sidewall system 330) may comprise a variable length along the width of each sidewall, and/or a variable width along the length of each sidewall. For example, first sidewall 332 and second sidewall 344 of sidewall system 230 may comprise variable lengths (e.g., first sidewall length 334) along their widths (e.g., first sidewall width 336) and/or variable widths (e.g., first sidewall width 336) along their lengths (e.g., first sidewall length 334). Further to this example, a top edge and/or bottom edge along first sidewall 332 and/or second sidewall 342 (e.g., top edge 337 and/or bottom edge 338 of first sidewall 332) may taper along the length and/or width of first sidewall 332 and/or second sidewall 342. Such tapering may occur from a forward portion of the sidewall system to an aft portion of the sidewall system (i.e., the length/width of the sidewalls decrease along the sidewall from the forward portion to the aft portion), or vice versa. In various embodiments, the first sidewall of a sidewall system may be a mirror image of the second sidewall.

In various embodiments, the sidewalls of a sidewall system may be flat (e.g., first sidewall 232 and second sidewall 242). In various embodiments, the sidewalls of a sidewall system may be concave and/or convex, or otherwise create a nacelle interior space having sides or side boundaries that are bowed outward and/or inward, respectively (e.g., by having sidewalls comprising radii, and/or sidewalls comprising multiple panels having vertices between adjacent panels). In various embodiments, the sidewalls of a sidewall system (e.g., first sidewall 232 and second sidewall 242) may be vented to increase airflow into the lift nacelle. In various embodiments, a sidewall system may comprise one or more sidewalls spanning at least a portion of the nacelle interior space of the lift nacelle between outer sidewalls of the sidewall system (e.g., between first sidewall 232 and second sidewall 242 of sidewall system 230). Such a sidewall may define different portions of the nacelle interior space, and/or be configured to direct airflow 80 within the nacelle interior space, and within the lift nacelle generally, in a desired manner. In various embodiments, such a sidewall may be substantially parallel to outer sidewalls and span at least a portion between forward portion 202 and aft portion 203 of lift nacelle 200 (wherein "substantially" means plus or minus 15 degrees from parallel).

In various embodiments, with reference again to FIGS. 2A and 2B, sidewall system 230 (or sidewall system 330 in shown in FIGS. 3A and 3B) may comprise an open top 244. Stated in other words, a top boundary of nacelle interior space 205 (or nacelle interior space 305 in shown in FIGS. 3A and 3B) may be open to the environment or atmosphere surrounding sidewall system 230 and/or lift nacelle 200. The top boundary of nacelle interior space 205 may correspond to, and span between, a first sidewall top portion 231 of first sidewall 232 and a second sidewall top portion 241 of second sidewall 242. An open top (e.g., open top 244) may allow for the forces generated by the lift body (e.g., lift body 250, or lift body 350 shown in FIGS. 3A and 3B)) (described further herein) to act on the lift nacelle, and not just the lifting body. Stated another way, the open top allows for the low-pressure air at or proximate to a top portion of the rotor to interact with, and act on, the outside atmosphere (e.g., airflow from the surrounding atmosphere may be taken into the lift nacelle through the open top and deflected downward). This allows the force generated by the rotor to act on the entire lift nacelle and not just the lift body 250. An open top may also allow airflow into the nacelle interior space to interact with the lift body in addition to the airflow generated by the airflow generator entering the lift nacelle through the forward portion of the lift nacelle. In various embodiments, a sidewall system may comprise a top portion that is at least partially closed to the environment or atmosphere surrounding the lift nacelle.

Similarly, in various embodiments, sidewall system 230 (or sidewall system 330 in shown in FIGS. 3A and 3B) may comprise an open bottom 246. Stated in other words, a bottom boundary of nacelle interior space 205 may be open to the environment or atmosphere surrounding sidewall system 230 and/or lift nacelle 200. The bottom boundary of nacelle interior space 205 may correspond to, and span between, a first sidewall bottom portion 233 of first sidewall 232 and a second sidewall bottom portion 243 of second sidewall 242. An open bottom (e.g., open bottom 246) of the lift nacelle may allow for high-pressure air at or proximate to a bottom portion (e.g., bottom portion 257) of the lift body to interact with the outside atmosphere (e.g., airflow may be deflected downward and out of the lift nacelle through the open bottom). This interaction may allow the forces generated by the lift body (discussed further herein) to act on the surrounding atmosphere. Therefore, such forces not only act on the lift body itself, but also act on the lift nacelle as a whole. The open bottom may also allow deflected air in response to the interaction of airflow 80 with the lift body to travel out of the open bottom and create extra vertical (lift) force. In various embodiments, a sidewall system may comprise a bottom portion that is at least partially closed to the environment or atmosphere surrounding the lift nacelle.

In various embodiments, sidewall system 230 may comprise at least one support beam 248 (or at least one support beam 348 in sidewall system 330 of FIGS. 3A and 3B) coupled to, and/or spanning between first sidewall 232 and second sidewall 242. Such support beams 248 may serve to provide stability to the structure of sidewall system 230 and/or lift nacelle 200, and/or direct airflow 80 through nacelle interior space 205.

In various embodiments, an airflow generator may provide a forward or aft boundary of the nacelle interior space. For example, airflow generator 210 may define the forward boundary of nacelle interior space 205. The aft boundary of nacelle interior space 205 may be open to allow airflow 80 to exit nacelle interior space 205, which may cause a thrust force on lift nacelle 200 in the forward direction. In various embodiments, in the nacelle interior space, and/or at the aft boundary of the nacelle interior space, the lift nacelle may comprise one or more airfoils and/or cowlings to deflect airflow downward after interaction with the lift generator, to provide further lift. In various embodiments, the airflow generator, or a plurality of airflow generators, may span at least the entire distance between the first sidewall and the second sidewall of the sidewall system at a forward and/or aft portion of the lift nacelle, and/or at least the entire distance between the sidewall system (or nacelle interior space) top boundary and bottom boundary at a forward and/or aft portion of the lift nacelle. In various embodiments, the airflow generator, or a plurality of airflow generators, may span at least a majority of the distance between the first sidewall and the second sidewall at a forward portion and/or aft portion of the lift nacelle, and/or at least a majority of the distance between the sidewall system (or nacelle interior space) top boundary and bottom boundary at a forward portion and/or aft portion of the lift nacelle (wherein, "majority" means greater than 50%, 70%, or 90% of the subject length).

Lift body 250 may comprise a body coupled to and spanning at least partially between sidewalls of sidewall system 230. Lift body 250 may be disposed along an axis between sidewalls of sidewall system 230 that traverses, or is substantially perpendicular to, the aft direction (e.g., the direction of airflow into nacelle interior space 205 resulting from operation of airflow generator 210). In various embodiments, a lift body (e.g., lift body 250) may be disposed at least partially within nacelle interior space (e.g., nacelle interior space 205) such that the airflow 80 entering the nacelle interior space may interact with at least a portion the lift body. In various embodiments, airflow 80 may interact with portions of a lift body within and/or external to the nacelle interior space.

Figure 2B:
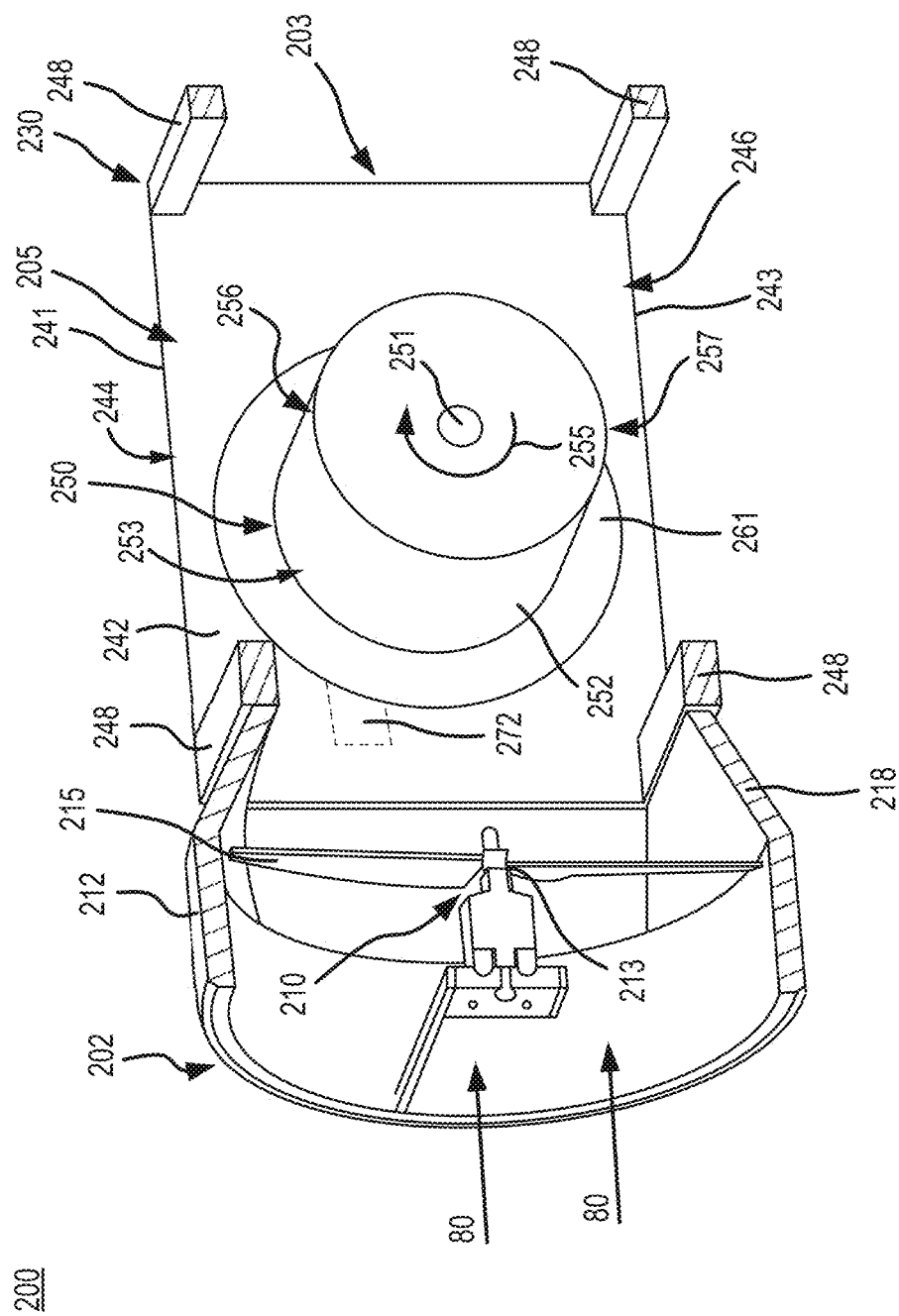
FIG. 2B illustrates a cross-sectional view of the lift nacelle of FIG. 2A, in accordance with various embodiments.

In various embodiments, lift body 250 may comprise an internal rotor 252 configured to rotate about an axis 251. Internal rotor 252 may be coupled to, and/or span at least partially between, first sidewall 232 and second sidewall 242. In various embodiments, internal rotor 252 may comprise a circular cross section, as depicted in FIG. 2B (showing a cross section of lift nacelle 200 of FIG. 2A taken along plane J-F), or any other suitable shape. The outermost points of an outer surface of internal rotor 252 may define a circle of rotation while internal rotor 252 rotates (e.g., outer surface 253 of internal rotor 252, or the vertices of an internal rotor have a noncircular shape, such as a square, hexagon, octagon, or the like).

In various embodiments, a two-dimensional cross-sectional shape of an internal rotor of a lift nacelle (e.g., the circular cross-sectional shape of internal rotor 252 in FIG. 2B) may comprise a uniform area between the first sidewall and the second sidewall, to and/or between which the internal rotor may be coupled. For example, as shown in FIGS. 2A and 2B, internal rotor 252 may comprise a circular cross-sectional shape having a uniform area along the length of internal rotor 252 between first sidewall 232 and second sidewall 242 (making internal rotor have a cylindrical shape). In various embodiments, a two-dimensional cross-sectional shape of an internal rotor of a lift nacelle may comprise a variable area along the internal rotor between the first sidewall and the second sidewall. For example, at a midpoint between the first sidewall and the second sidewall on an internal rotor of a lift nacelle, the cross-sectional area may be greatest, and gradually decrease moving toward the first sidewall and second sidewall. As another example, at a midpoint between the first sidewall and the second sidewall on an internal rotor of a lift nacelle, the cross-sectional area may be smallest, and gradually increase moving toward the first sidewall and second sidewall. The two-dimensional cross-sectional area along an internal rotor of a lift nacelle may vary in any suitable manner between the first sidewall and second sidewall (e.g., creating wave-like patterns). In various embodiments, outer surface 253 of internal rotor 252 may comprise a plurality of bumps and/or pits, trenches radially recessed into outer surface 253 and spanning circumferentially and/or axially along outer surface 253, and/or texturing, to increase the interaction between internal rotor 252 and airflow 80. Such a design may also allow for boundary layer control advantages on outer surface 253.

In various embodiments, the internal rotor of a lift nacelle (e.g., internal rotor 252) may comprise any suitable structure and/or configuration. For example, the internal rotor and/or the outer rotor shell (e.g., outer rotor shell 454, shown in FIG. 4) of the internal rotor may be permeable. Allowing airflow through the internal rotor or the outer rotor shell of internal rotor with such a configuration may yield aerodynamic advantages such as control over stagnation point, boundary layer control, lift vector control, and/or the like. To accomplish airflow being allowed through the internal rotor or the outer rotor shell of the internal rotor, such components may comprise a layer having holes (e.g., resembling a strainer), slits (e.g., resembling a louver), a wireframe rotor such that the outer rotor shell of the internal rotor is comprised of wires with spaces therebetween, or the like.

In various embodiments, an internal rotor in a lift nacelle may comprise ridges coupled to and/or protruding radially outward from an outer surface of the internal rotor along at least a portion of the radial portion of the outer surface (e.g., along at least a portion of the cross-sectional circumference of the internal rotor or the circle of rotation). For example, internal rotor 252 may comprise a ridge 261 protruding radially from outer surface 253. Ridge 261 may be positioned in any suitable position along the length of internal rotor 252 between first sidewall 232 and second sidewall 242. For example, ridge 261, as show in FIGS. 2A and 2B, may be positioned proximate and/or adjacent to second sidewall 242. Ridge 261 may be positioned such there is little or no space between ridge 261 and second sidewall 242 (e.g., a tight fit between ridge 261 and second sidewall 242). In various embodiments, there may be a ridge protruding from outer surface 253 of internal rotor 252 proximate and/or adjacent to first sidewall 232 and/or second sidewall 242 (e.g., ridges 361 protruding radially from each end of internal rotor 352, depicted in FIGS. 3A and 3B and/or ridge 461 protruding radially from an end of internal rotor 452, depicted in FIG. 4). Similar to ridge 261, in various embodiments, ridges protruding from outer surface 253 of internal rotor 252 proximate and/or adjacent to first sidewall 232 and/or second sidewall 242 may be positioned such that there are little or no space between first sidewall 232 and second sidewall 242 and the respective ridges. Ridges being disposed at the ends of internal rotor 252 (i.e., proximate and/or adjacent to first sidewall 232 and second sidewall 242) may be referred to as "end caps." End caps may prevent or minimize equilibrium airflow resulting from the interaction of airflow 80 with internal rotor 252 during lift nacelle 200 operation. Such equilibrium airflow may cause wingtip vortices, which may have a negative effect on lift and/or propulsion force generated by lift nacelle 200. Therefore, the presence of ridges (e.g., end caps) protruding from outer surface 253 may have beneficial effects on the performance of lift nacelle 200 by preventing or minimizing wingtip vortices.

In various embodiments, an internal rotor may comprise at least one ridge protruding radially from the outer surface of the internal rotor in positions between the ends of the internal rotor. For example, as shown in FIGS. 3A and 3B, an internal rotor 352 may comprise a ridge 363 (or more than one ridge 363) protruding from outer surface 353 between the ends of internal rotor 352 proximate first sidewall 332 and second sidewall 342. Ridge 363 may serve to improve and/or optimize lift created by internal rotor 352 by reducing spanwise airflow (i.e., airflow traveling in directions toward first sidewall 332 and/or second sidewall 342 rather than in the aft direction).

In various embodiments, ridges protruding radially from the outer surface of an internal rotor may form a sharp edge between a wall of the ridge and the outer surface of the internal surface. In various embodiments, the ridges on the outer surface of the internal rotor may comprise chamfers, or may otherwise gradually transition in radial protrusion height to the peak of the ridge on either side of such peak. The ridges, as described herein, may span any suitable length of the internal rotor (i.e., the ridges may have any suitable thickness).

In various embodiments, ridges disposed on the outer surface of an internal rotor may be coupled to and/or integral with the internal rotor and/or the outer surface. In various embodiments, the ridges protruding from the outer surface of an internal rotor may be monolithic with the internal rotor and/or the outer surface.

Internal rotor 252 may rotate in rotational direction 255, such that, at a top portion 256 of the circle of rotation (e.g., defined by outer surface 253 of internal rotor 252), opposite a bottom portion 257, a vector for static friction acting on airflow 80 is in the aft direction (e.g., toward aft portion 203, as depicted in FIGS. 2A and 2B), and at bottom portion 257, a vector for static friction acting on airflow 80 is in the forward direction (e.g., toward forward portion 202, as depicted in FIGS. 2A and 2B). That is, outer surface 253 of internal rotor 252 may impart additional kinetic energy to airflow 80 at or proximate top portion 256. Describing the direction of rotation of internal rotor 252 in another way, if viewing lift nacelle 200 from aft portion 203 along an axis spanning from aft portion 203 to forward portion 202, first sidewall 232 would be a left sidewall and second sidewall 242 would be a right sidewall. If rotational axis 251 protruding in the left direction (i.e., outward from nacelle interior space 205 through the left sidewall) is defined as the positive direction, internal rotor 252 rotates in the negative direction (i.e., rotational direction 255) according to the right-hand rule of physics. In other words, internal rotor 252 has an angular velocity direction toward the right sidewall as viewed from aft portion 203, according to the right-hand rule of physics.

During operation of lift nacelle 200, internal rotor 252 may rotate in rotational direction 255, as described above, and airflow generator 210 may accelerate airflow 80 from a forward boundary of lift nacelle 200 in an aft direction into nacelle interior space 205. As discussed herein, the airflow generator of a lift nacelle may be disposed at any suitable position(s) or portion(s) of the lift nacelle to achieve such airflow (e.g., at a forward portion 202 of lift nacelle 200 (or forward portion 302 of lift nacelle 300 in FIGS. 3A and 3B) and/or at an aft portion 203 of lift nacelle). As airflow 80 passes through nacelle interior space 205, airflow 80 contacts and/or interacts with internal rotor 252 rotating in rotational direction 255. Airflow 80 contacting and/or interacting with top portion 256 of internal rotor 252 may accelerate in the aft direction as a result of internal rotor 252 rotating in rotational direction 255. Stated another way, in response to internal rotor 252 rotating in rotational direction 255, friction between airflow 80 and outer surface 253 at or proximate top portion 256 of outer surface 253 may cause the portion of airflow 80 at or proximate top portion 256 to accelerate in the aft direction (e.g., internal rotor 252 may pull airflow 80 at or proximate top portion 256, or apply force on such airflow 80, in the aft direction, accelerating such airflow 80). Airflow 80 contacting and/or interacting with bottom portion 257 of internal rotor 252 may decelerate in the aft direction as a result of internal rotor 252 rotating in rotational direction 255. Stated another way, in response to internal rotor 252 rotating in rotational direction 255, friction between airflow 80 and outer surface 253 at or proximate bottom portion 257 of outer surface 253 may cause the portion of airflow 80 at or proximate bottom portion 257 to decelerate in the aft direction (e.g., internal rotor may push airflow 80 at or proximate bottom portion 257, or apply force on such airflow 80, in the forward direction opposite the aft direction of airflow 80 travel, decelerating such airflow 80 in the aft direction, or in other words, accelerating such airflow 80 in the forward direction). Such rotation by internal rotor 252 may deflect airflow 80 such that a wake aft of internal rotor 252 travels in a downward direction (e.g., toward open bottom 246).

The acceleration of airflow 80 at or near top portion 256 may cause the pressure in a top portion of nacelle interior space 205 (i.e., a portion of nacelle interior space 205 more proximate top portion 256 of internal rotor 252) to have a lower pressure relative to a bottom portion of nacelle interior space 205 (i.e., a portion of nacelle interior space 205 more proximate bottom portion 257 of internal rotor 252). The bottom portion of nacelle interior space 205 may have a higher pressure because of the decelerated airflow 80 proximate to bottom portion 257 of internal rotor 252. The pressures of airflow 80 proximate different portions of internal rotor 252 during operation is caused by Bernoulli's principle, which says that an increase in fluid speed occurs simultaneously with decrease in pressure (e.g., the effect on airflow 80 proximate top portion 256 of rotating internal rotor 252), and a decrease in fluid speed occurs simultaneously with an increase in pressure (e.g., the effect on airflow 80 proximate bottom portion 257 of rotating internal rotor 252).

The pressure differential between airflow 80 proximate top portion 256 versus bottom portion 257 of rotating internal rotor 252 may cause the lower pressure airflow 80 proximate top portion 256 to exert less pressure (a downward pressure) on internal rotor 252 (and therefore, on lift nacelle 200) than the pressure exerted on internal rotor 252 by higher pressure airflow 80 proximate bottom portion 257 (an upward pressure), creating lift (i.e., a force in an upward or lift direction toward the top portion nacelle interior space 205). Further, the downwardly deflected airflow also causes a lift force on internal rotor 252 and/or other components of lift nacelle 200. The lift force may be substantially perpendicular to the direction of airflow 80 before interaction with internal rotor 252, and/or substantially perpendicular to rotational axis 251 of internal rotor and/or the axis of rotation for airflow generator 210. As used herein, "substantially" means plus or minus 15 degrees from perpendicular. The lift force may cause lift nacelle 200, and/or anything coupled to lift nacelle 200, to lift from a plane or surface (e.g., the ground), or otherwise gain elevation from a plane or surface.

Figure 4:
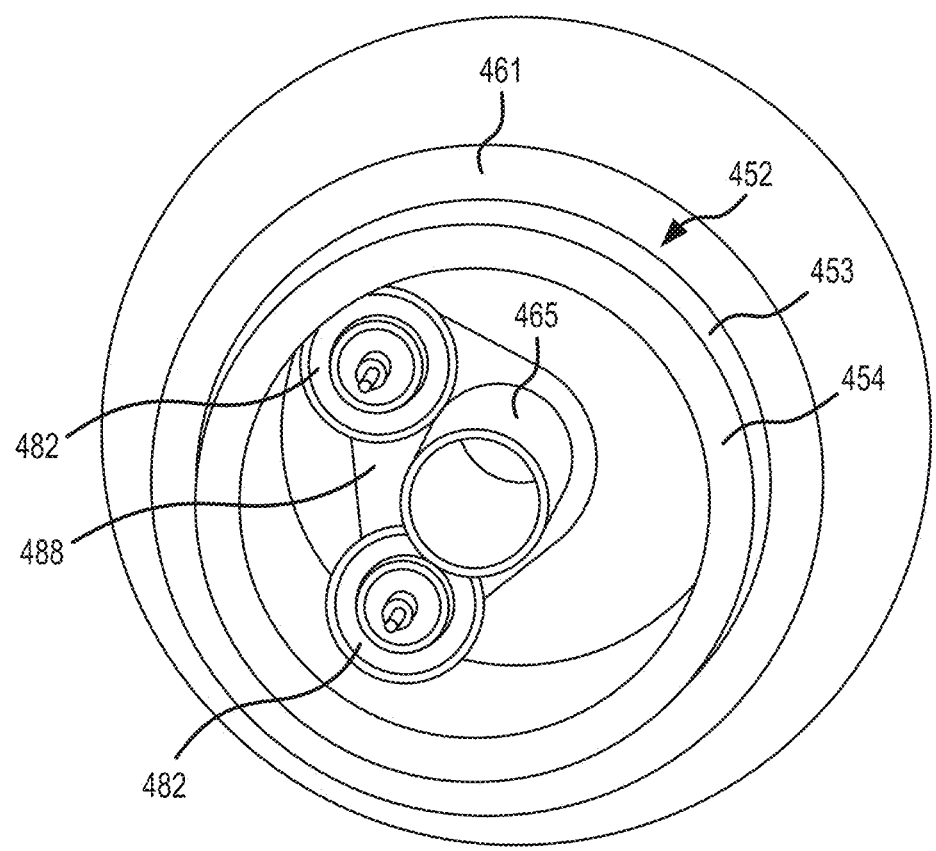
FIG. 4 illustrates a cross-sectional view of an internal rotor of a lift nacelle, in accordance with various embodiments.

In various embodiments, with additional reference to FIG. 4, an internal rotor 452 (an example of internal rotor 252 and/or 352 in FIGS. 2A,B and 3A,B, respectively), may comprise a hollow interior defined by an outer rotor shell 454. Outer rotor shell 454 may comprise outer surface 453 of internal rotor 452 which interacts with airflow during lift nacelle operation. A rotor shaft 465 may be disposed through the hollow interior of internal rotor 452, for example, along an axis of rotation about which outer rotor shell 454 of internal rotor 452 rotates. Rotor shaft 465 may provide stability for internal rotor 452 within the lift nacelle and/or couple internal rotor to a first sidewall and a second sidewall of a wall system of the lift nacelle. In various embodiments, an internal rotor may not be hollow and/or comprise any suitable structure or configuration.

In various embodiments, a nacelle comprising an internal rotor may comprise at least one motor configured to cause the internal rotor (or an outer rotor shell thereof) to rotate. The motor may be coupled to the internal rotor to achieve such a function in any suitable manner, such as being coupled to, in contact with, and/or in mechanical communication with the outer surface and/or the outer rotor shell of the internal rotor. For example, as depicted in FIG. 4, internal rotor 452 may comprise a motor 482 (or multiple motors 482, i.e., any suitable number of motors 482) disposed in the hollow interior of internal rotor 452. Motors 482 may be coupled to rotor shaft 465 and/or outer rotor shell 454 such that in response to motors 482 rotating, outer rotor shell 454 rotates. In various embodiments, outer rotor shell 454 may comprise a flexible material as an outer surface 453 that rotates similar to a conveyor belt in response to motors 482 rotating. In various embodiments, rotor shaft 465 may rotate in response to motors 482 rotating. Motor 482 may be coupled to rotor shaft 465, and cause rotation of rotor shaft 465, which in turn, may cause outer rotor shell 454 of internal rotor 452 to rotate. In various embodiments, rotor shaft 465 may remain stationary as motors 482 rotate (because motors 482 are not in contact with rotor shaft 465), which may conserve energy, minimizing the mass that is rotated via power provided from a power source.

In various embodiments, motors 482 may be coupled to rotor shaft 465 via mounting bracket 488. That is, motors 482 may be coupled to mounting bracket 488, and mounting bracket 488 may be coupled to rotor shaft 465, a side wall of the side wall system, and/or the any other suitable component. Motors 482 may be disposed such that they are contacting outer rotor shell 454, but not contacting rotor shaft 465, such that, in response to motors 482 rotating, outer rotor shell 454 rotates, but rotor shaft 465 remains unaffected and uncontacted by motor 482 rotation. Mounting bracket 488 may also function as a simplified cooling system for motors 482, as heat from the motors may be transferred to rotor shaft 465 or sidewalls via mounting bracket 488. Internal rotor 452 and the components therein may be cooled by airflow within the lift nacelle during operation. In various embodiments, a lift nacelle may comprise cooling fans disposed in or proximate to the internal rotor to cool the internal rotor and/or the components therein.

In various embodiments, a motor of a lift nacelle configured to rotate an internal rotor may be coupled to an external portion of the internal rotor and/or any other aspect of the lift nacelle external to the internal rotor. For example, the motor may be coupled to an external portion of the internal rotor (or another suitable nacelle component) such that the motor may cause the internal rotor to rotate. In various embodiments, the motor may be in mechanical communication with the internal rotor via a belt and pulley system coupled between the motor and the internal rotor such that the belt and pulley system transfers the movement of the rotor to the internal rotor, causing the internal rotor to rotate.

Figure 5:
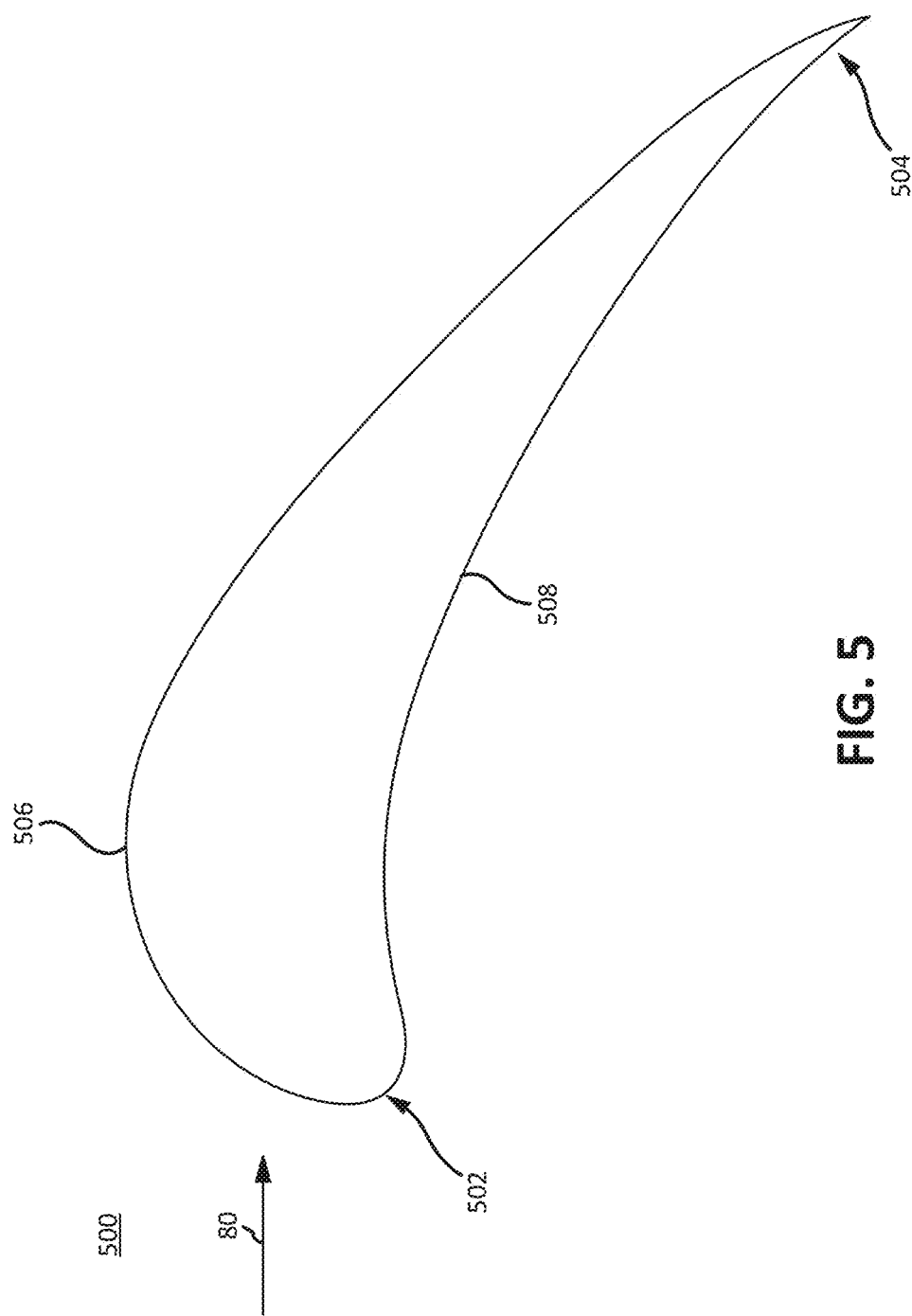
FIG. 5 illustrates an airfoil, in accordance with various embodiments.

In various embodiments, with additional reference to FIG. 5, the lift body of a lift nacelle may comprise a passive device, such as an airfoil 500. Airfoil 500 may be coupled to and span at least partially between a first sidewall and a second sidewall of a sidewall system within the nacelle interior space of the lift nacelle. Airfoil 500 may comprise a leading edge 502 at a forward portion of airfoil 500, a trailing edge 504 at an aft portion of airfoil 500 opposite leading edge 502, a suction side 506 at a top portion of airfoil 500, and/or a pressure side 508 at a bottom portion of airfoil 500 opposite suction side 506. Suction side 506 and pressure side 508 may span between the leading edge and trailing edge of airfoil 500. Suction side 506 may be convex, and pressure side 508 may be concave, such that, when disposed in the lift nacelle, the cross-sectional shape of airfoil 500 (e.g., along a plane such as J-F depicted in FIGS. 2A and 2B) resembles an upside-down "check mark" shape.

During operation of a lift nacelle comprising an airfoil (e.g., airfoil 500) as a lift body, as discussed herein, an airflow generator(s) may accelerate airflow (e.g., airflow 80) from a forward boundary of the lift nacelle in an aft direction into the nacelle interior space. As discussed herein, the airflow generator of a lift nacelle may be disposed at any suitable position(s) or portion(s) of the lift nacelle to achieve such airflow. As the airflow passes through the nacelle interior space, the airflow contacts and/or interacts with airfoil 500. Airflow contacting and/or interacting with suction side 506 of airfoil 500 may travel faster in the aft direction than airflow interacting with pressure side 508 of airfoil 500. The airflow interacting with suction side 506 may travel relatively faster as a result of the airflow traveling a longer distance to the trailing edge of airfoil 500, and/or being less obstructed, than airflow interacting with suction side 506. That is, pressure side 508 of airfoil 500 may obstruct and/or decelerate airflow, causing the air pressure under airfoil 500 (i.e., proximate pressure side 508) to be greater than the air pressure above airfoil 500 (i.e., proximate suction side 506). Airfoil 500 may deflect the airflow interacting with airfoil 500 downward, such that a turbulent wake aft of airfoil 500 travels in a downward direction (e.g., toward open bottom of the nacelle interior space).

The acceleration, or relatively faster speed, of airflow at or near suction side 506 may cause the pressure in a top portion of the nacelle interior space (i.e., a portion of the nacelle interior space more proximate suction side 506 of airfoil 500) to have a lower pressure relative to a bottom portion of the nacelle interior space (i.e., a portion of the nacelle interior space more proximate pressure side 508 of airfoil 500). Pressure side 508 of airfoil 500 may cause a higher air pressure because of the decelerated airflow proximate pressure side 508. The pressures of the airflow proximate different sides of airfoil 500 (suction side 506 and pressure side 508) during operation of the lift nacelle is caused by Bernoulli's principle, which says that an increase in fluid speed occurs simultaneously with decrease in pressure (e.g., the effect on the airflow proximate suction side 506), and a decrease in fluid speed occurs simultaneously with an increase in pressure (e.g., the effect on the airflow proximate pressure side 508).

The pressure differential between airflow proximate suction side 506 versus pressure side 508 of airfoil 500 may cause the lower pressure airflow proximate suction side 506 to exert less pressure (a downward pressure) on airfoil 500 (and therefore, on the lift nacelle) than the pressure exerted (an upward pressure) on airfoil 500 by higher pressure airflow proximate pressure side 508, creating lift. Further, the downwardly deflected airflow may also cause a lift force on airfoil 500 and/or other components of the lift nacelle. The lift force may be substantially perpendicular to the direction of airflow before interaction with airfoil 500, and/or substantially perpendicular to an axis between a first sidewall and a second sidewall along which airfoil 500 is disposed, and/or substantially parallel to a direction starting at pressure side 508 and moving to suction side 506 of airfoil 500. As used herein, "substantially" means plus or minus 15 degrees from perpendicular or parallel. The lift force may cause the lift nacelle, and/or anything coupled to the lift nacelle, to lift from a plane or surface (e.g., the ground), or otherwise gain elevation from a plane or surface.

In various embodiments, suction side 506 of an airfoil may comprise bumps, pits, or turbulators to provide further aerodynamic properties such as boundary layer control.

In various embodiments, the lift body of a lift nacelle may be coupled to the sidewall system in any suitable manner. For example, with reference to FIGS. 2A and 2B, internal rotor 252 may be coupled to first sidewall 232 and second sidewall 242 by internal rotor 252 being coupled to the internal edges of first sidewall 232 and second sidewall 242, such that there is little or no space between internal rotor 252 and the internal edges of first sidewall 232 and second sidewall 242. In various embodiments, internal rotor 252 may be coupled to first sidewall 232 and second sidewall 242 by each end of internal rotor 252 being disposed at least partially through first sidewall 232 and second sidewall 242. In various embodiments, internal rotor 252 may be disposed completely through, and coupled to, first sidewall 232 and/or second sidewall 242. In such embodiments, the ends of internal rotor 252 may be flush with, protrude from, or internal to an outer surface of each of first sidewall 232 and/or second sidewall 242. In various embodiments, in which internal rotor 252 is coupled to first sidewall 232 and/or second sidewall 242 by the ends of internal rotor 252 being disposed within and at least partially through first sidewall 232 and/or second sidewall 242, a rotor bearing coupled to each end of internal rotor 252 may be disposed at least partially within each of first sidewall 232 and/or second sidewall 242, encircling internal rotor 252 and allowing internal rotor 252 to rotate. This tight fit between internal rotor 252 and first sidewall 232 and/or second sidewall 242 may prevent or minimize tip vortices of airflow within nacelle interior space 205, and otherwise prevent or minimize turbulence, similar, or in addition, to the effects of ridges protruding radially from outer surface 253 of internal rotor 252.

In various embodiments, comprising an airfoil as a lift body, the airfoil may be similarly coupled to the first and second sidewalls of a sidewall system, as described herein relating to internal rotor 252.

In various embodiments, as depicted in FIGS. 3A and 3B, the lift body of a lift nacelle may extend past the boundaries of the sidewall system of the lift nacelle (and/or outside the boundaries of the nacelle interior space of the lift nacelle). For example, internal rotor 352 may extend more aft than first sidewall 332 and second sidewall 342 (or more forward than sidewalls), and/or may extend higher and/or lower than the top and bottom boundaries defined by sidewall system 330.

In various embodiments, a lift nacelle may comprise one or more power sources configured to provide power to the airflow generator and/or lift body. A power source(s) may be coupled to, and in communication (e.g., electronic and/or mechanical communication) with any suitable component of a lift nacelle, such as a sidewall of the sidewall system, a duct, a shroud of the airflow generator, the airflow generator, the lift body, or the like. For example, as depicted in FIG. 2B, a power source 272 may be coupled on the outside of second sidewall 242. Power source 272 may provide power to internal rotor 252 (e.g., to motor 482 in FIG. 4) to allow rotor to rotate. Power source 272 may also provide power to airflow generator 210. In various embodiments, the lift body and the airflow generator of a lift nacelle may comprise their own power source(s) (i.e., separate power sources). The power source may be coupled to a component of the lift nacelle proximate to, or within, the lift nacelle component to which the power source will provide power. In various embodiments, there may be one power source per lift nacelle.

In various embodiments, power source 272 may be any suitable power source such as a battery and electric motor, generator, gasoline-fueled engine, or the like. The power source of a lift nacelle may be independent of other power sources, such that a lift nacelle comprising a power source may operate independently from other components or systems. For example, a lift nacelle coupled to the fuselage of a vehicle (e.g., an aircraft) may operate without integrating with a power source in the fuselage.

In various embodiments, a lift nacelle may comprise multiple lift bodies. For example, a lift nacelle may comprise multiple internal rotors and/or multiple airfoils. As another example, a lift nacelle may comprise at least one internal rotor and at least one airflow. The multiple lift bodies may be disposed in parallel or in series within the nacelle interior space. In various embodiments, the lift bodies may be offset from each other within the nacelle interior space. For example, there may be a first lift body (e.g., an internal rotor) forward of a second lift body (e.g., an airfoil), wherein the second lift body is also lower within the interior nacelle space than the first lift body. Such an arrangement may allow more control on airflow within the lift nacelle and/or allow more control over lift. For example, airflow deflected downward from a first lift body, may be deflected downward even further by a second lift body disposed aft and below the first lift body. Any suitable arrangement and combination of one or more lift bodies is within the scope of this disclosure.

In various embodiments, at least one lift body in a lift nacelle may be centered along a lift body axis perpendicular to the direction of airflow (e.g., along plane J-F providing the cross-sectional view of FIG. 2B, and/or along the rotational axis 251 of internal rotor 252). Such an arrangement may allow a maximum or most efficient quantity of airflow 80 drawn into the nacelle interior space to interact with the centered lift body. In various embodiments, at least one lift body in a lift nacelle may be offset from the center of an airflow generator, such that more airflow 80 travels over a top portion of the lift body, further increasing the airflow velocity of the airflow 80 proximate the top portion of the lift body relative to the airflow proximate the bottom portion of the lift body, thus decreasing the pressure proximate the top portion relative the bottom portion of the lift bottom, creating additional lift.

Figure 6:
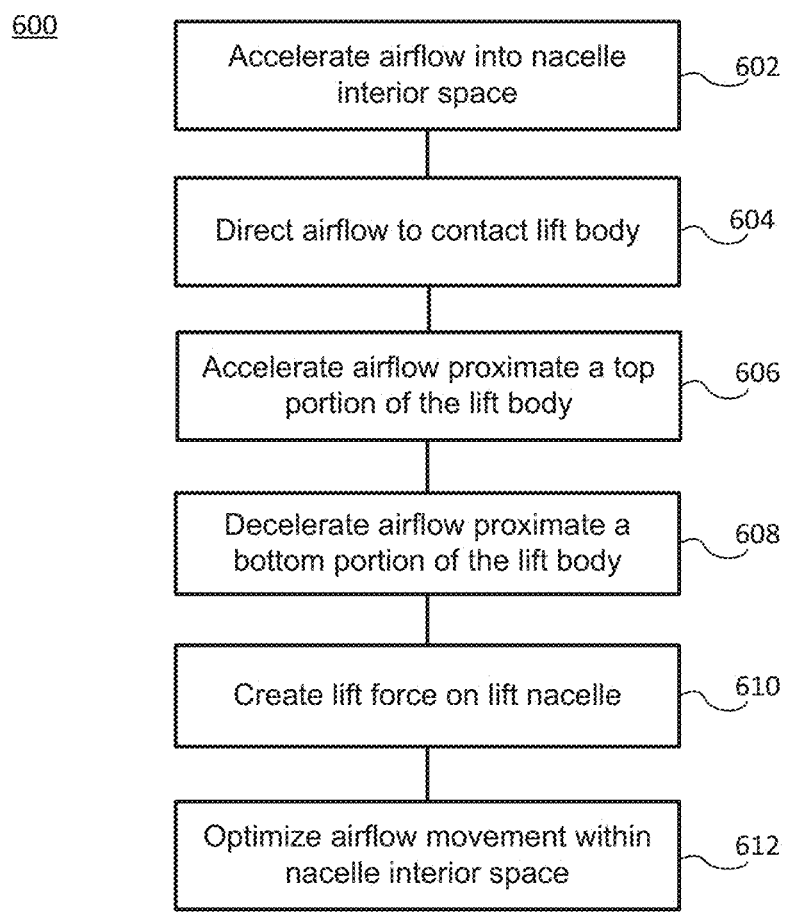
FIG. 6 illustrates a method for creating lift using a lift nacelle, in accordance with various embodiments.

FIG. 6 depicts a method 600 for creating lift using a lift nacelle, in accordance with various embodiments. With additional reference to FIGS. 2A and 2B, during operation of a lift nacelle, airflow 80 may be accelerated into nacelle interior space (step 602) by airflow generator 210. Airflow 80 may be directed to contact lift body 250 (step 604) by, for example, a shroud 212 around airflow generator 210, a duct 218 further directing airflow 80 into nacelle interior space 205, and/or sidewall system 230 (e.g., by first sidewall 232 and/or second sidewall 242 of sidewall system 230).

In response to airflow contacting lift body 250, airflow 80 proximate a top portion 256 of lift body (or suction side 506 of airfoil 500) may accelerate (step 606), and/or airflow 80 proximate a bottom portion 257 of lift body 250 (or pressure side 508 of airfoil 500) may decelerate (step 608). In various embodiments, airflow 80 proximate top portion 256 of lift body 250 may not accelerate, but may comprise a faster airflow velocity than airflow 80 proximate a bottom portion 257 of lift body 250. Similarly, in various embodiments, airflow 80 proximate a bottom portion 257 of lift body 250 may not decelerate, but may comprise a slower air speed than airflow 80 proximate top portion 256 of lift body 250. Such a difference in air speed between airflow 80 proximate top portion 256 (relatively faster airflow, having a relatively lower pressure) and airflow 80 proximate bottom portion 257 (relatively slower airflow, having a relatively higher pressure) may cause a pressure differential between the associated portions of nacelle interior space 205. As a result, a lift force may be created on lift body 250 and/or lift nacelle 200 (step 610). The lift force may be the result of airflow 80 proximate bottom portion 257 of lift body 250 having a higher pressure, and therefore, exerting a greater upward pressure on lift body 250 than the force on lift body 250 exerted by airflow 80 proximate top portion 256 of lift body 250, and/or the downward deflection of airflow 80 aft of lift body 250 (creating an upward force).

In various embodiments, airflow 80 within nacelle interior space 205 may be optimized (step 612) by directing airflow via shroud 212, duct 218, and/or the shape of nacelle interior space 205 defined by sidewall system 230. Airflow 80 within nacelle interior space 205 may also be optimized by adding ridges to an internal rotor 252, or otherwise varying the outer surface(s) of lift body 250, as discussed herein.

In accordance with various embodiments discussed herein, lift nacelles may provide greater efficiency with regard to the amount of power required to create lift than other vehicles capable of vertical takeoff (e.g., helicopters). The lift nacelles of the present disclosure have significant advantages over the horizontal rotors of helicopters, such as greater efficiency at generating lift. As evidence of the greater efficiency of lift nacelles, FIG. 7 depicts results from a model in which the necessary power (in Watts) required to achieve a certain amount of lift (in Newtons) was compared between a lift nacelle in accordance with this disclosure, and a horizontal ducted propeller.

Figure 7:
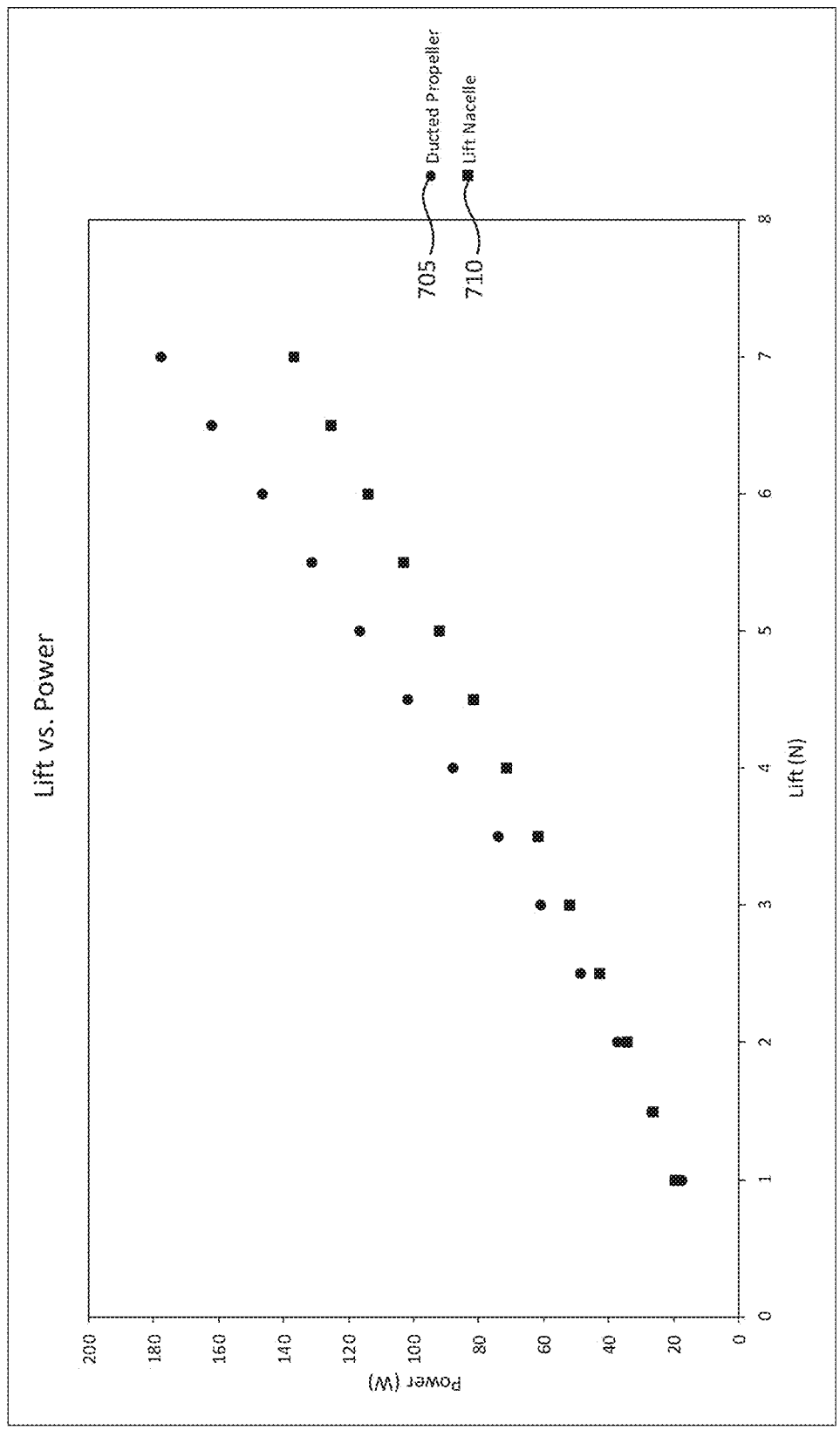
FIG. 7 illustrates experimental data of lift created by a lift nacelle versus a ducted propeller, in accordance with various embodiments.

In obtaining the results shown in FIG. 7, first, an experiment was conducted to obtain the lift coefficient and spin ratio chart for the internal rotor in the lift nacelle (the internal rotor serving as the lift body of the lift nacelle). The internal rotor comprised a rotor length of 0.28 meter and a rotor diameter of 0.20 meter. A spin ratio of 2.3 and a lift coefficient of 3.8 was obtained from the experiment, and both of these results were confirmed against scientific literature. Second, the power consumed versus the lift generated by the horizontal ducted propeller (which is also used as the airflow generator of the lift nacelle) was measured at various levels. To measure power consumed, a wattage meter was disposed between the battery and the motor powering the horizontal ducted propeller. The lift was obtained by measuring thrust created by the horizontal ducted propeller. The airflow velocity created by the horizontal ducted propeller (the airflow generator of the lift nacelle) was also measured during the experiment. Third, the power consumed by the internal rotor at various rotations-per-minute levels was measured. To create the model shown in FIG. 7, the power consumed versus the lift generated by the ducted horizontal propeller was plotted. In order to plot the power consumed versus the lift generated by the lift nacelle, as shown in FIG. 7, the lift generated by the lift nacelle was calculated based on the known airflow velocity in the lift nacelle at various power levels, the rotations per minute of the internal rotor at various power levels, the spin ratio, and the lift coefficient. To obtain the total power consumed by the lift nacelle, the power consumed by the airflow generator and the internal rotor of the lift nacelle was combined at corresponding lift levels. Accordingly, the power consumed versus the lift generated (calculated as described above) by the lift nacelle was plotted, as shown in FIG. 7.

In order to confirm viability of the model, the results of which are shown in FIG. 7, a desired lift value (in Newtons) was selected, and an experiment was conducted to determine the power consumed by the horizontal ducted propeller and the lift nacelle to produce the desired lift value. For the experiment, the same parameters as described above were used. Additionally, the airflow generator of the lift nacelle was disposed at a forward portion of the lift nacelle, and the lift nacelle comprised flat first and second sidewalls and open top and bottom portions of the nacelle interior space. Airflow into the lift nacelle was ducted between the first and second sidewalls of the lift nacelle, which were 0.28 meter apart. The air density was 1.21 kilograms/cubic meter. The internal rotor comprised two ridges protruding radially from the outer surface of the internal rotor. One ridge was disposed on one end of the internal rotor proximate and/or adjacent to the first sidewall, and the other ridge was disposed on the other end of the internal rotor proximate and/or adjacent to the second side wall (e.g., similar to end cap ridges 261 described in relation to FIGS. 2A and 2B).

During the experiment, the horizontal ducted propeller (having a 0.41 meter diameter) was powered to create a certain airflow velocity in order to produce the desired lift value via thrust. Lift was measured via load cells disposed on the test stand of the horizontal ducted propeller. The power required for the horizontal ducted propeller to achieve such a lift value was measured by a wattage meter disposed between the battery and the motor powering the propeller.

Regarding the lift nacelle, a corresponding lift coefficient was calculated based on the desired lift value and the internal rotor dimensions (a rotor length of 0.28 meter and a rotor diameter of 0.20 meter). A chart was used (based on scientific literature and aforementioned experiments) to obtain the spin ratio necessary to achieve the desired lift value and lift coefficient. Then, the desired airflow velocity through the lift nacelle to achieve the desired lift value was calculated based on the internal rotor diameter, air density, and spin ratio.

Based on the above, continuing with the experiment, the internal rotor of the lift nacelle was spun up to the correct number of rotations per minute for the determined spin ratio, and the electric motor powering the airflow generator was powered to a power setting required to achieve the desired airflow velocity through the lift nacelle. Four load cells (one coupled to each corner of the lift nacelle) measured the corresponding lift created. The power consumed by the lift nacelle from rotating the internal rotor and the airflow generator, and the resulting lift value, were compared with the power consumed and the corresponding lift value of the model reflected in FIG. 7. The power consumed (measured via a wattage meter) and the resulting lift value produced by the lift nacelle matched (within appropriate error) the power consumption level and corresponding lift value shown in the model reflected in FIG. 7, thus validating the model.

As can be seen in FIG. 7, as lift increased, the power required to achieve such lift by the horizontal ducted propeller (shown by data set 705) increased at a significantly faster rate than the power required by the lift nacelle (shown by data set 710). In fact, the power required for the propeller to increase lift exponentially increases, while the power required for the lift nacelle increases at a slower rate. This shows that the lift nacelles in accordance with the present disclosure are capable at significantly greater efficiency in producing lift, which translates into longer flight ranges and/or and increased payload capabilities without increasing fuel/power allotments. Additionally, traditional rotorcrafts (e.g., helicopters) have a top speed of about 140 miles per hour, which is limited by the horizontal orientation of the rotor/propeller because of the unbalance of forces created along the rotor's rotational path during forward flight. The lift nacelles in the present disclosure, however, are not limited in such a manner, and therefore, the top speed resembles that of propeller-drive aircraft (e.g., over 500 miles per hour).

The lift nacelles of the present disclosure provide other benefits as well. For example, the cost of maintenance is low, and the reliability is high, relative to traditional aircraft because of the simplicity of lift nacelles. The lift nacelle is a standalone component that does not require power or components from another device and/or system. Therefore, inspection times for safety and maintenance will decrease relative to helicopters and other traditional aircraft. Additionally, the few moving parts decrease the opportunity for failures within the system. Vehicles comprising multiple lift nacelles are capable of vertical takeoff and subsequent forward motion without the tilting of the lift nacelles or any part therein (unlike a tiltrotor aircraft). Even further, aircraft comprising lift nacelles may be smaller in size than other aircraft, while still being able to carry comparable payloads. This small size may allow greater mobility of a lift nacelle aircraft, as one person, or a small group of people, may be able to move or transport such an aircraft on the ground. Also, because of the lower airflow velocities utilized within the lift nacelle relative to helicopters and other traditional aircraft, lift nacelles will produce a lesser decibel level without the loud, high-speed air buffeting. As an example, in the model that yielded the results shown in FIG. 7, to generate 6.2 Newtons of lift, the propeller produced an airflow velocity of about 8.9 meters/second, while the lift nacelle produced an airflow velocity of about 6.9 meters/second (a reduction in airflow velocity of 22% to achieve the same lift force).

In various embodiments, a lift nacelle may be coupled to a body, creating a vehicle. This is another benefit of the lift nacelles of this disclosure. With reference again to FIGS. 2A and 2B, lift nacelle 200 is a modular, standalone system, and therefore, may be coupled to a main body to create an aircraft (or another type of vehicle configured to operate in a fluid), or retrofit to an existing aircraft to provide more lift. For example, with additional reference to FIG. 8, one or more lift nacelles 200 (as described herein in relation to FIGS. 2A and 2B) may be coupled to a main body 810 to form an aircraft 800.

Figure 8:
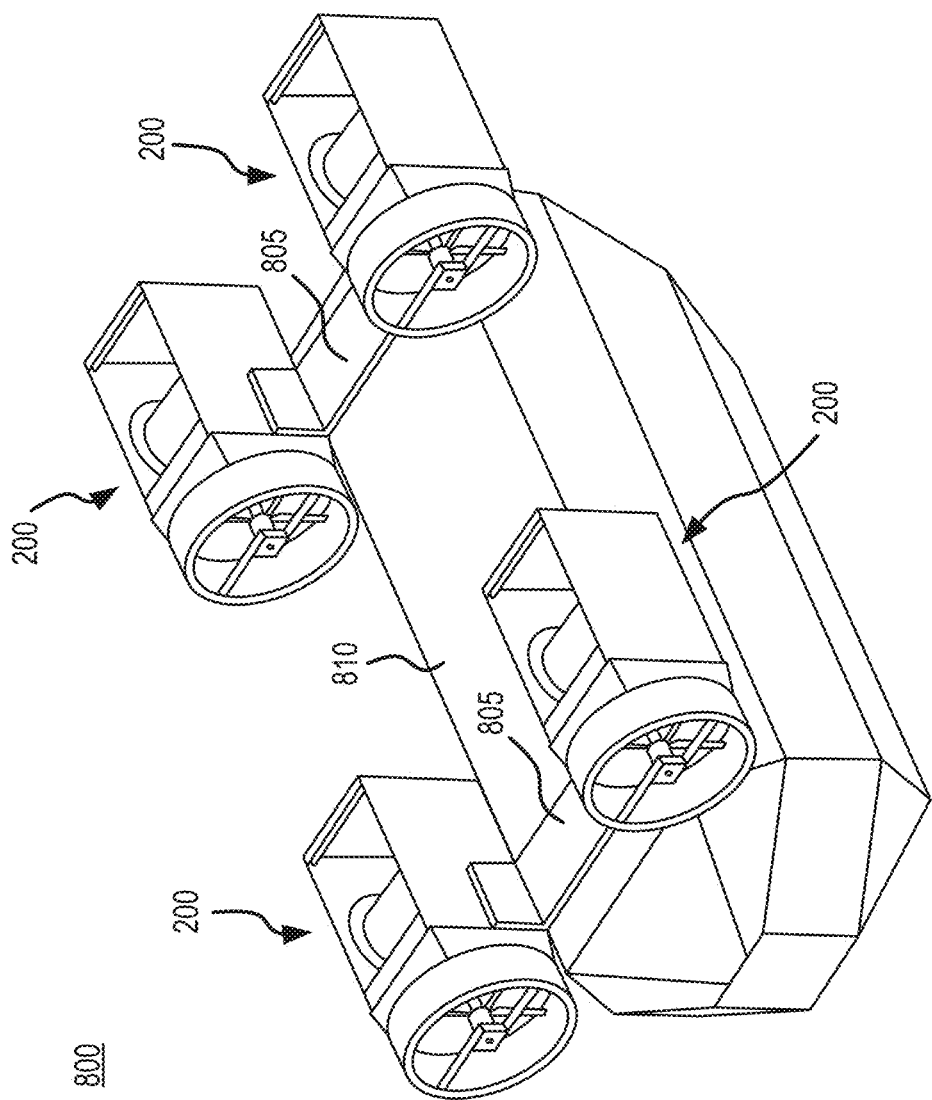
FIG. 8 illustrates a vehicle comprising lift nacelles, in accordance with various embodiments.

An aircraft may comprise any suitable number of lift nacelles disposed in any suitable arrangement or configuration. In various embodiments, as depicted in FIG. 8, aircraft 800 may comprise four lift nacelles 200, which may be coupled to an upper portion or edge of main body 810. Lift nacelles 200 may be coupled on the same plane to main body 810. In various embodiments, with additional reference to FIG. 9, lift nacelles 300 may be coupled to a main body to form an aircraft in a staggered configuration. For example, a front two lift nacelles 300 (proximate front portion 902) may be on a separate plane (e.g., a lower plane, or a plane closer to the ground) than a rear or aft two lift nacelles 300. As another example, the distance between a rear or aft two lift nacelles may be larger than the distance between a front two lift nacelles on a vehicle, or vice versa.

Figure 9:
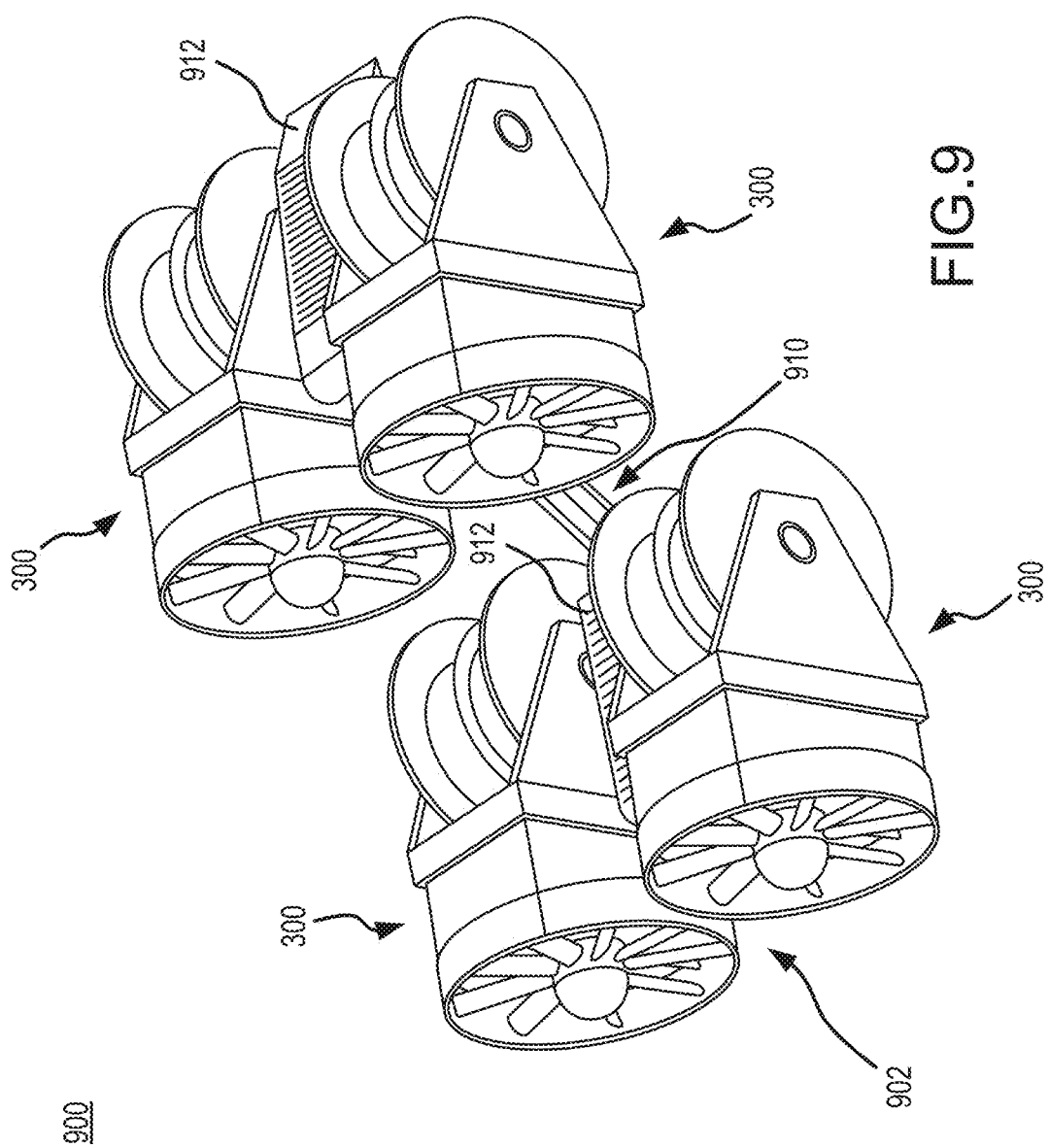
FIG. 9 illustrates a system comprising multiple lift nacelles, in accordance with various embodiments.

Lift nacelles on an aircraft, in various embodiments, may be fixedly coupled to the main body of the aircraft (i.e., the lift nacelles are unable to rotate in any direction). For example, lift nacelles 200 in FIG. 8 may be fixedly coupled to main body 810 via mounting panels 805. Similarly, as depicted in FIG. 9, lift nacelles 300 may be fixedly coupled to structural frame 910. Lift nacelles 300 may be coupled to mounting brackets 912 on ends of structural frame 910. Structural frame 910 may couple to a main body of, or to form, an aircraft (e.g., by hanging a main body from structural frame 910), and/or structural frame 910 may be disposed within and through a main body, providing further structural support for the main body. The structural frame 910 may distribute weight of the aircraft between lift nacelles 300. In various embodiments, the lift nacelles on an aircraft may be coupled to the main body of the aircraft such that the lift nacelles may rotate in various directions. In various embodiments, a set of wheels may be coupled to the main body and/or structural frame of an aircraft to more easily move the aircraft.

Having multiple lift nacelles (e.g., four) greatly improves the safety of an aircraft. In various embodiments, each of the four lift nacelles may be rated to carry 33% of the takeoff weight of the aircraft. Therefore, if one lift nacelle fails or malfunctions, the other lift nacelles will be unaffected (e.g., because each lift nacelle has its own power source), and the remaining lift nacelles may provide enough power and lift to allow a safe landing.

The components of a lift nacelle may be comprised of any suitable material or combination of materials, including metal and metal alloys (e.g., steel, aluminum and aluminum alloys, titanium and titanium alloys, and the like), polymeric materials, composite materials, and/or the like.

While the description herein discusses operation of a lift nacelle in air (or as part of an aircraft), it should be understood that a lift nacelle may be implemented in any fluid (e.g., water), or on any craft operating in a fluid (e.g., a boat). In relation to other applications of a lift nacelle, such as a boat, all mentions to "air" in this disclosure would simply apply to the appropriate fluid, (e.g., water or another liquid for a boat, or the like).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The present disclosure is dedicated to, and in memory of, our friend, Joshua P. Fitzpatrick.

What is claimed is:

1. A lift nacelle, comprising:
   an airflow generator;
   a sidewall system coupled to the airflow generator, wherein the sidewall system at least partially defines a nacelle interior space,
   wherein the airflow generator at least partially defines a boundary of the nacelle interior space; and
   a lift body comprising an internal rotor at least partially disposed within the nacelle interior space,
   wherein the airflow generator is configured to accelerate airflow to contact the lift body.

2. The lift nacelle of claim 1, wherein the internal rotor is configured to rotate about an axis of rotation spanning between a first sidewall portion and a second sidewall portion of the sidewall system.

3. The lift nacelle of claim 2, wherein the first sidewall portion is coupled to an airflow generator first side and spans in a first direction, and the second sidewall portion is coupled to an airflow generator second side opposite the airflow generator first side and spans in the first direction, wherein the lift body spans at least partially between the first sidewall portion and the second sidewall portion.

4. The lift nacelle of claim 1, further comprising a shroud coupled to the sidewall system and having a shroud wall enclosing a shroud interior, wherein the airflow generator is disposed within the shroud interior.

5. The lift nacelle of claim 1, wherein at least one of:
   at least a portion of a top boundary of the nacelle interior space, or at least a portion of a bottom boundary of the nacelle interior space, is open.

6. The lift nacelle of claim 1, wherein at least one of a forward boundary or an aft boundary of the nacelle interior space is open.

7. The lift nacelle of claim 6, wherein the aft boundary of the nacelle interior space is open and opposite the airflow generator, which at least partially defines the forward boundary of the nacelle interior space.

8. The lift nacelle of claim 6, wherein the aft boundary of the nacelle interior space is forward of an aft portion of the lift body.

9. The lift nacelle of claim 1, wherein the internal rotor comprises an outer rotor shell defining a hollow rotor interior, wherein the lift body further comprises a motor disposed in the hollow rotor interior configured to rotate the outer rotor shell.

10. The lift nacelle of claim 9, further comprising a rotor shaft disposed in and along the hollow rotor interior, wherein the rotor shaft is coupled to the motor.

11. The lift nacelle of claim 10, wherein the motor is coupled to the rotor shaft via a mounting bracket, such that the motor is coupled to the mounting bracket, and the mounting bracket is coupled to the rotor shaft.

12. The lift nacelle of claim 11, wherein the motor is configured to rotate and cause the outer rotor shell to rotate while the rotor shaft remains static.

13. The lift nacelle of claim 1, further comprising a power source coupled to at least one of the airflow generator, the sidewall system, or the lift body, wherein the power source is configured to provide power for operation of at least one of the airflow generator and the internal rotor.

14. The lift nacelle of claim 1, further comprising a motor coupled to the internal rotor, external to an outer surface of the internal rotor, such that the internal rotor rotates in response to rotation of the motor.

15. The lift nacelle of claim 1, wherein the internal rotor comprises an outer surface and at least one ridge coupled to and protruding radially from the outer surface along at least a portion of a circumference of the outer surface.

16. A method, comprising:
   accelerating airflow via an airflow generator coupled to a sidewall system of a lift nacelle;
   rotating an internal rotor at least partially disposed within the sidewall system;
   directing the airflow to contact the internal rotor; and
   creating a lift force on the lift nacelle in response to the airflow contacting the internal rotor.

17. The method of claim 16, wherein the airflow generator is one of a propeller or a fan, wherein the method further comprises rotating the airflow generator causing the accelerating the airflow.

18. The method of claim 16, further comprising:
   rotating a motor disposed within a hollow rotor interior defined by an outer shell of the internal rotor, wherein the rotating the internal rotor comprises rotating the outer shell, which is in response to the rotating the motor, wherein the internal rotor further comprises a rotor shaft disposed in and along the hollow rotor interior, wherein the rotor shaft remains static in response to the motor and the outer shell rotating.

19. The method of claim 16, wherein the internal rotor comprises an outer surface and at least one ridge coupled to and protruding radially from the outer surface, wherein the method further comprises at least one of:
   minimizing a vortex of the airflow proximate an outer end of the internal rotor in response to the at least one ridge being coupled to the outer surface at the outer end of the internal rotor, wherein the outer end of the internal rotor is disposed proximate to or at least partially within a wall of the sidewall system of the lift nacelle, or reducing spanwise flow of the airflow in response to the at least one ridge being coupled between outer ends of the internal rotor.

20. A lift nacelle, comprising:

an airflow generator;

a sidewall system coupled to the airflow generator; and a lift body coupled to the sidewall system, wherein the lift body comprises an internal rotor, wherein the airflow generator is configured to accelerate airflow and cause the airflow to contact the lift body.

\* \* \* \* \*